(12) United States Patent
George et al.

(10) Patent No.: US 10,922,287 B2
(45) Date of Patent: Feb. 16, 2021

(54) INTELLIGENT LAYOUT OF COMPOSITE DATA STRUCTURES IN TIERED STORAGE

(71) Applicant: Cisco Technology, Inc., San Jose, CA (US)

(72) Inventors: Johnu George, San Jose, CA (US); Amit Kumar Saha, Bangalore (IN); Arun Saha, Fremont, CA (US); Debojyoti Dutta, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 222 days.

(21) Appl. No.: 15/811,318

(22) Filed: Nov. 13, 2017

(65) Prior Publication Data

US 2018/0341411 A1    Nov. 29, 2018

Related U.S. Application Data

(60) Provisional application No. 62/510,666, filed on May 24, 2017.

(51) Int. Cl.
| | |
|---|---|
| *G06F 16/00* | (2019.01) |
| *G06F 16/21* | (2019.01) |
| *G06F 3/06* | (2006.01) |
| *G06F 16/24* | (2019.01) |
| *G06F 12/08* | (2016.01) |
| *H04L 12/06* | (2006.01) |

(52) U.S. Cl.
CPC .............. *G06F 16/21* (2019.01); *G06F 3/067* (2013.01); *G06F 3/0611* (2013.01); *G06F 3/0635* (2013.01); *G06F 3/0659* (2013.01); *G06F 3/0679* (2013.01); *G06F 12/08* (2013.01); *G06F 16/214* (2019.01); *G06F 16/24* (2019.01); *G06F 3/064* (2013.01); *H04L 12/06* (2013.01)

(58) Field of Classification Search
CPC ............................... G06F 16/21; G06F 16/214
See application file for complete search history.

(56) References Cited

U.S. PATENT DOCUMENTS

| | | | |
|---|---|---|---|
| 6,691,101 | B2 | 2/2004 | MacNicol et al. |
| 7,480,672 | B2 | 1/2009 | Hahn et al. |
| 8,086,755 | B2 | 12/2011 | Duffy, IV et al. |
| 8,713,405 | B2 | 4/2014 | Healey, Jr. et al. |
| 8,990,335 | B2 | 3/2015 | Fauser et al. |

(Continued)

OTHER PUBLICATIONS

Astakhov et al., "Lambda Architecture for Batch and RealTime Processign on AWS with Spark Streaming and Spark SQL," Amazon Web Services (AWS), May 2015, pp. 1-12.

(Continued)

*Primary Examiner* — Thu Nguyet T Le
(74) *Attorney, Agent, or Firm* — Polsinelli PC (57) ABSTRACT

Aspects of the subject technology relate to ways to determine the optimal storage of data structures in a hierarchy of memory types. In some aspects, a process of the technology can include steps for determining a latency cost for each of a plurality of fields in an object, identifying at least one field having a latency cost that exceeds a predetermined threshold, and determining whether to store the at least one field to a first memory device or a second memory device based on the latency cost. Systems and machine-readable media are also provided.

20 Claims, 5 Drawing Sheets

(56) References Cited

U.S. PATENT DOCUMENTS

| | | | |
|---|---|---|---|
| 9,003,159 B2 | 4/2015 | Deshkar et al. | |
| 9,043,530 B1* | 5/2015 | Sundaram | G06F 3/068 |
| | | | 711/100 |
| 9,229,810 B2 | 1/2016 | He et al. | |
| 9,244,761 B2 | 1/2016 | Yekhanin et al. | |
| 9,244,776 B2 | 1/2016 | Koza et al. | |
| 9,361,192 B2 | 6/2016 | Smith et al. | |
| 9,374,270 B2 | 6/2016 | Nakil et al. | |
| 9,479,556 B2 | 10/2016 | Voss et al. | |
| 9,483,337 B2 | 11/2016 | Gladwin et al. | |
| 9,558,078 B2 | 1/2017 | Farlee et al. | |
| 9,613,078 B2 | 4/2017 | Vermeulen et al. | |
| 9,794,366 B1 | 10/2017 | Pabon et al. | |
| 2002/0103815 A1 | 8/2002 | Duvillier et al. | |
| 2003/0174725 A1 | 9/2003 | Shankar | |
| 2005/0141312 A1* | 6/2005 | Sinclair | G06F 11/1072 |
| | | | 365/222 |
| 2008/0016297 A1* | 1/2008 | Bartley | G06F 12/08 |
| | | | 711/159 |
| 2008/0229010 A1 | 9/2008 | Maeda et al. | |
| 2012/0066473 A1* | 3/2012 | Tremaine | G06F 13/1694 |
| | | | 711/206 |
| 2013/0290634 A1 | 10/2013 | Cheng et al. | |
| 2013/0297872 A1* | 11/2013 | Hyde, II | G06F 3/061 |
| | | | 711/117 |
| 2015/0142733 A1 | 5/2015 | Shadmon | |
| 2015/0222444 A1 | 8/2015 | Sarkar | |
| 2015/0302058 A1 | 10/2015 | Li et al. | |
| 2016/0119159 A1 | 4/2016 | Zhao et al. | |
| 2016/0335361 A1 | 11/2016 | Teodorescu et al. | |
| 2017/0053132 A1 | 2/2017 | Resch | |
| 2017/0132094 A1 | 5/2017 | Ma et al. | |
| 2018/0219737 A1* | 8/2018 | Schulz | H04L 41/0826 |
| 2018/0314511 A1 | 11/2018 | Butcher et al. | |

OTHER PUBLICATIONS

Coburn et al., "NV-Heaps: Making Persistent Objects Fast and Safe with Next-Generation, Non-Volatile Memories," ASPLOS '11, Mar. 5-11, 2011, 2011 ACM, pp. 1-13.

Venkataraman et al., "Consistent and Durable Data Structures for Non-Volatile Byte-Addressable Memory," FAST'11: Proceedings of the 9th USENIX conference on File and storage technologies, Feb. 2011, pp. 1-15.

"Graph API Version: User," pp. 1-8 May 2017.

Sympetheros, "How does Alluxio react when out of memory," Mar. 29, 2016, 1 page.

Wei et al., "Accelerating Cloud Storage System with Byte-addressable Non-Volatile Memory," 2015 IEEE 21st International Conference on Parallel and Distributed Systems, 2015 IEEE, pp. 354-361.

"Introduction: What is Alluxio, v. 2.3," pp. 1-3 May 2017.

Dulloor et al., "Data Tiering in Heterogeneous Memory Systems," EuroSys '16, Apr. 18-21, 2016, pp. 1-16.

Quick Start Guide—Alluxio v 2.3, pp. 1-7 May 2017.

* cited by examiner

```
Object {
    int age;
    byte[100] image;
    string place;
    string name;
}
```

FIG. 4A

```
object employee {
    int permissions;@byte_addressable,@memory_speed
    char name [100]; @persistent
    int age; @byte_addressable, @persistent
    int grade; @byte_addressable, @persistent
    char image[10MB]; @persistent int compute_permissions () {
        return func (age, grade);
    }
}
```

INTELLIGENT LAYOUT OF COMPOSITE DATA STRUCTURES IN TIERED STORAGE

CROSS-REFERENCE TO RELATED APPLICATIONS

This application claims the benefit of U.S. Application No. 62/510,666, filed May 24, 2017, entitled "INTELLIGENT LAYOUT OF COMPOSITE DATA STRUCTURES IN TIERED STORAGE WITH PERSISTENT MEMORY", which is incorporated herein by reference in its entirety.

BACKGROUND

1. Technical Field

The subject technology relates to the field of computing and in particular, to an intelligent layout of composite data structures in tiered storage with persistent memory.

2. Introduction

Persistent memory (PMEM) is a non-volatile, low latency memory. Persistent memory can include flash memory using the Non-volatile Memory Express (NVMe) protocol. Persistent memory (PMEM) can be fast like volatile memory (e.g., dynamic random access memory (DRAM)), but persistent memory has the benefit of persistent data storage. In addition to providing data persistence, persistent memories are byte addressable, and have access speeds closer to that of DRAM. However, PMEM is not a pure replacement for DRAM or storage devices like hard-disk drives (HDDs) and solid-state drives (SSDs), because it is not as fast as DRAM and cannot scale to the storage sizes provided by magnetic storage disks, such as HDDs, or solid-state storage devices (SSDs).

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Overview:

Some of the advantages of persistent memory, such as persistence and byte-addressability, make it an ideal storage-type for retrieval of frequently accessed information. However, persistent memory is relatively expensive compared to slower memory types, such as conventional magnetic drives (e.g., HDDs). Therefore, it may not be feasible or cost effective, to store all information in persistent memory. It would be desirable to improve memory retrieval by identifying data that should be stored into a specific memory device type based on information use characteristics.

Description:

Aspects of the subject technology address the foregoing need by providing methods of storing data to a particular memory device-type. In some aspects, the selected storage type is based on a metric that is used to compute various aspects of a data retrieval cost. For example, a retrieval cost for a particular field of an object may be based on an access frequency for the field (e.g., a frequency that the field is retrieved), and/or an access cost factor (e.g., a cost involved in read/write operations performed for the field on its current memory device). In some aspects, the retrieval cost for a particular object field may also be based on a latency of the corresponding storage device, and/or a re-computation cost factor, i.e., a cost involved in re-computation of the field value if the field value is not persisted. The data retrieval metric can be used to compute a (latency) cost for each field of a program object. Generally, high latency cost data (object-fields) are prioritized for storage in persistent memory, for example, to reduce retrieval time and memory footprint; low cost object fields are stored to slower memory types, such as spinning magnetic drives (HDDs), if data persistence is needed, or to DRAM if data persistence is not needed.

Figure 1:
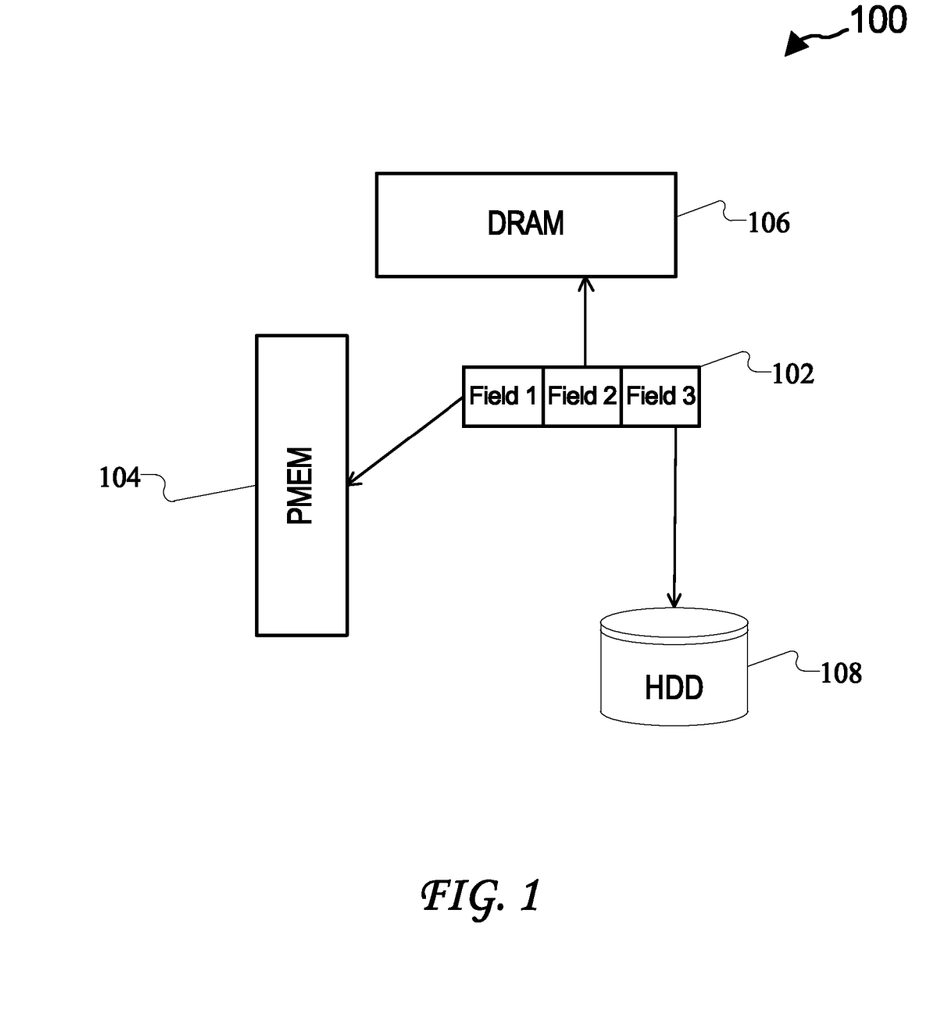
FIG. 1 illustrates an example data structure containing multiple fields that are stored in different memory device types, according to some aspects of the technology.

FIG. 1 conceptually illustrates an example environment 100, including a data structure 102 that contains multiple fields (e.g., Fields 1, 2, 3) that are stored in separate memory-types in a tiered memory structure. Data structure 102 can represent an object, for example, that refers to a particular instance of a class where the object can be a combination of variables, functions, and data structures, e.g., "fields" such as fields 1, 2, and 3.

In the illustrated example, each field of data structure (object) 102 is stored into a different memory device-type. For example, Field 1 of object 102 is stored into a persistent memory device (i.e., PMEM 104), Field 2 is stored into a DRAM device (i.e., DRAM 106), and Field 3 is stored into a hard-disk drive (HDD 108). Handling of the storage of different object-fields into different memory device types can be handled by a combination of software and/or hardware forming a dynamic memory allocator (not illustrated). It is understood that additional (or fewer) data structures, fields, and/or storage devices can be used, without departing from the scope of the technology.

A memory-type used to store each of fields (1, 2, 3) can be determined based on a cost metric (or cost function) used to evaluate read/write costs for each of the fields. An example cost function for a given object field is provided by the relationship in equation (1):

$$Cost[field]=AccessFreq(field)*ACFactor(field\ device)*Latency(device)*RCF(field) \quad (1)$$

where the total cost calculated for a particular field (Cost[field]) is proportional to the access frequency of the field (AccessFreq), an access cost factor (ACFactor) incurred when performing read/writes on the device, a latency of the device (Latency), and a re-computation cost factor (RCF) for the field. In some implementations, the access cost factor is given a constant value (e.g., '1') if the associated device supports byte-addressability, such as with PMEM and DRAM memory. Alternatively, if the device is not byte-addressable, the access cost factor (ACFactor) can be proportional to a serialization/deserialization cost associated with accessing the object-field, for example that is based on the field length in bytes. In such implementations, large field lengths can correspond with a greater cost. By using a cost metric that accounts for device and read/write latency, as well as device latency, and cost incurred by re-computation of non-persisted data, the cost function balances concurrent constraints related to data usage frequency, storage device characteristics (e.g., latency and persistence), and object re-computation.

In some aspects, the cost of an object (e.g., object 102) is a sum of costs associated with each field. Therefore, in the example of FIG. 1, the cost of object 102 could be computed using the relationship provided by equation (2):

$$Cost(Object\ 102)=Cost(Field\ 1)+Cost(Field\ 2)+Cost(Field\ 3) \quad (2)$$

It is understood that other cost functions may be used to compute a cost for a particular object and/or object-field, without departing from the scope of the technology. For example, a different cost metric may be used that accounts for other storage device types (e.g., with different latency and/or persistent characteristics), and/or that accounts for an amount of each available memory type, etc. Cost factors for each object-field may be either computed or estimated, depending on the implementation. By way of example, cost factor computation may be performed by running a benchmark on the object, for example, by simulating use of the object. That is, benchmarking can provide experimental cost factor approximations for each object and/or object-field, based on cost measurements for each object-field in a simulated computing environment.

In other aspects, cost factors for each object (and object field) can be determined on an ongoing basis, for example, as the object is utilized in its real-world computing environment. In this manner, costs associated with a particular object and/or object-field can be updated on an ongoing basis. Changes to the computed costs for a particular object and/or object field can be used to make changes to a type of memory storage that is used. In such approaches, thresholds used to determine whether to store a particular datum to a PMEM, DRAM or HDD storage device may be updated, for example, depending on changes to cost factor characteristics, or the resource availability of a particular storage device type.

A predetermined threshold can be used to determine what object and/or object fields are stored to a particular memory type. By way of example, the most costly objects and/or object fields may be stored to PMEM, e.g., when the associated cost exceeds a first predetermined threshold. In some aspects, objects and/or object fields may be stored to a DRAM device, for example, where the associated cost exceeds a second predetermined (cost) threshold, but does not exceed the first predetermined threshold i.e., where first predetermined threshold>object cost>second predetermined threshold, then DRAM may be utilized. Further to this example, HDD storage may be used for objects and/or fields that do not exceed the second predetermined (cost) threshold.

Cost thresholds used to determine a target storage device type (e.g., PMEM, DRAM or HDD), can be based on a total size of available memory for each memory type and/or based on a total memory footprint of objects and object-fields that can be stored. By way of example, if the number of objects is relatively small and can be easily stored in PMEM, then the cost threshold used to select PMEM storage may be lower, for example, to encourage storage of more objects and/or object-fields into PMEM. Alternatively, if the size of available PMEM is smaller, then the thresholds used to select PMEM and/or DRAM storage may be higher, e.g., to discourage PMEM storage, and to encourage the storage of more objects/object-fields into HDD.

Figure 2:
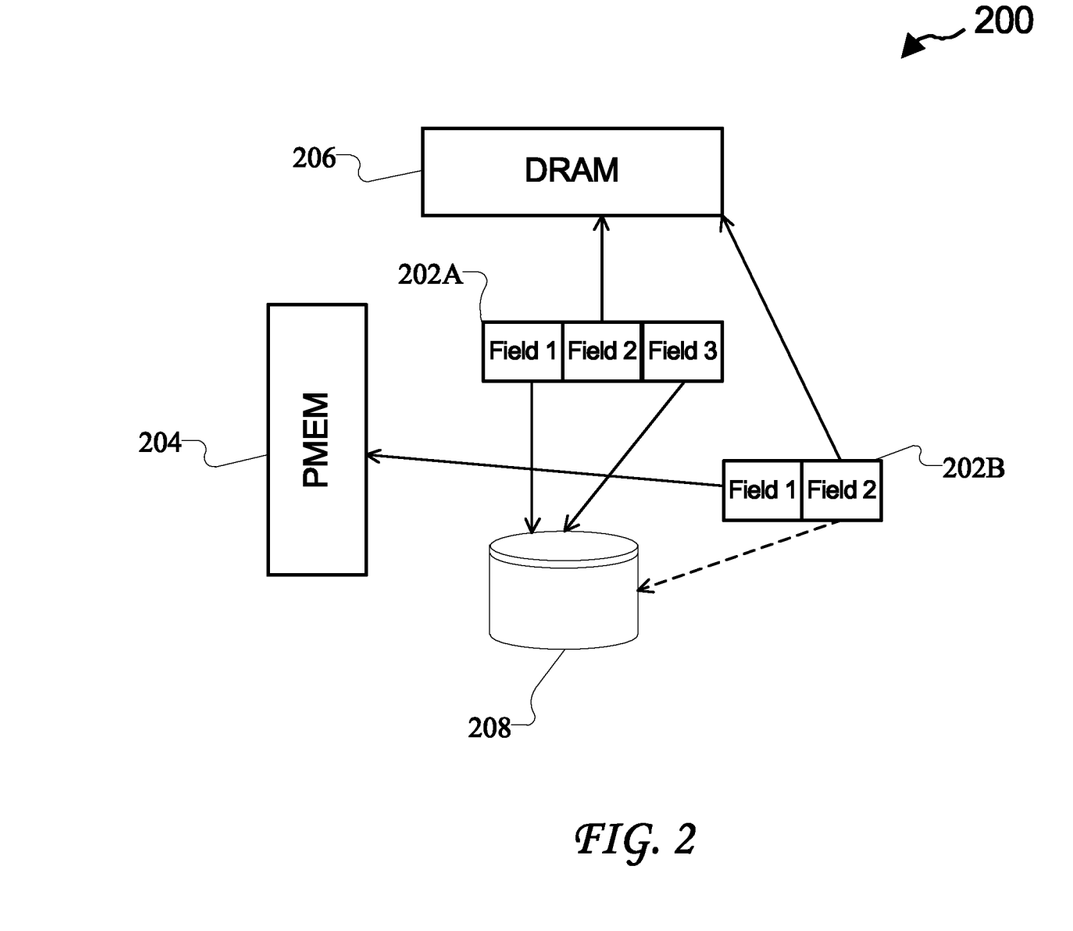
FIG. 2 illustrates multiple data structures containing fields that are stored in different memory device types, according to some aspects of the technology.

FIG. 2 conceptually illustrates an environment 200 in which multiple data structures (e.g., objects 202A and 202B) contain fields stored in separate memory structures. As illustrated, object 202A, includes three object-fields (Field 1, Field 2, and Field 3), whereas object 202B contains two object-fields (Field 1 and Field 2). It is understood that any number of object may be included, and that each object may contain virtually any number of fields, without departing from the scope of the technology.

The fields of object 202A are stored across DRAM 206 and HDD 208; that is, Field 1 and Field 3 of object 202A are stored to HDD 208, and Field 2 is stored to DRAM 206. As discussed above, these memory-type selections may be based on cost factors computed for each field of object 202A. For example, Fields 1,2, and 3 may not be accessed frequently enough to justify storage to PMEM 204, however, persistence may be desired so that re-computation is not needed for Field 1 and Field 3, and therefore they are stored to HDD 208.

In contrast, object 202B is stored across PMEM 204 and DRAM 206. That is, Field 1 of object 202B is stored to PMEM 204, and Field 2 of object 202B is stored to DRAM 206. As illustrated in the example of FIG. 2, Field 2 of object 202B is moved from storage in HDD 208 to DRAM 206. The change in storage location can be due to a change in a latency cost computed for Field 2. For example, if persistence is not important for data in Field 2, but read/write speeds are important, Field 2 may be moved from HDD 208 to DRAM 206. In some aspects, a change in storage device may be caused by a change in available storage resources. For example, the change in storage location for Field 2 of object 202B may be caused by an increase in storage resources in DRAM 206, and/or a decrease in storage resources in HDD 208.

Figure 3:
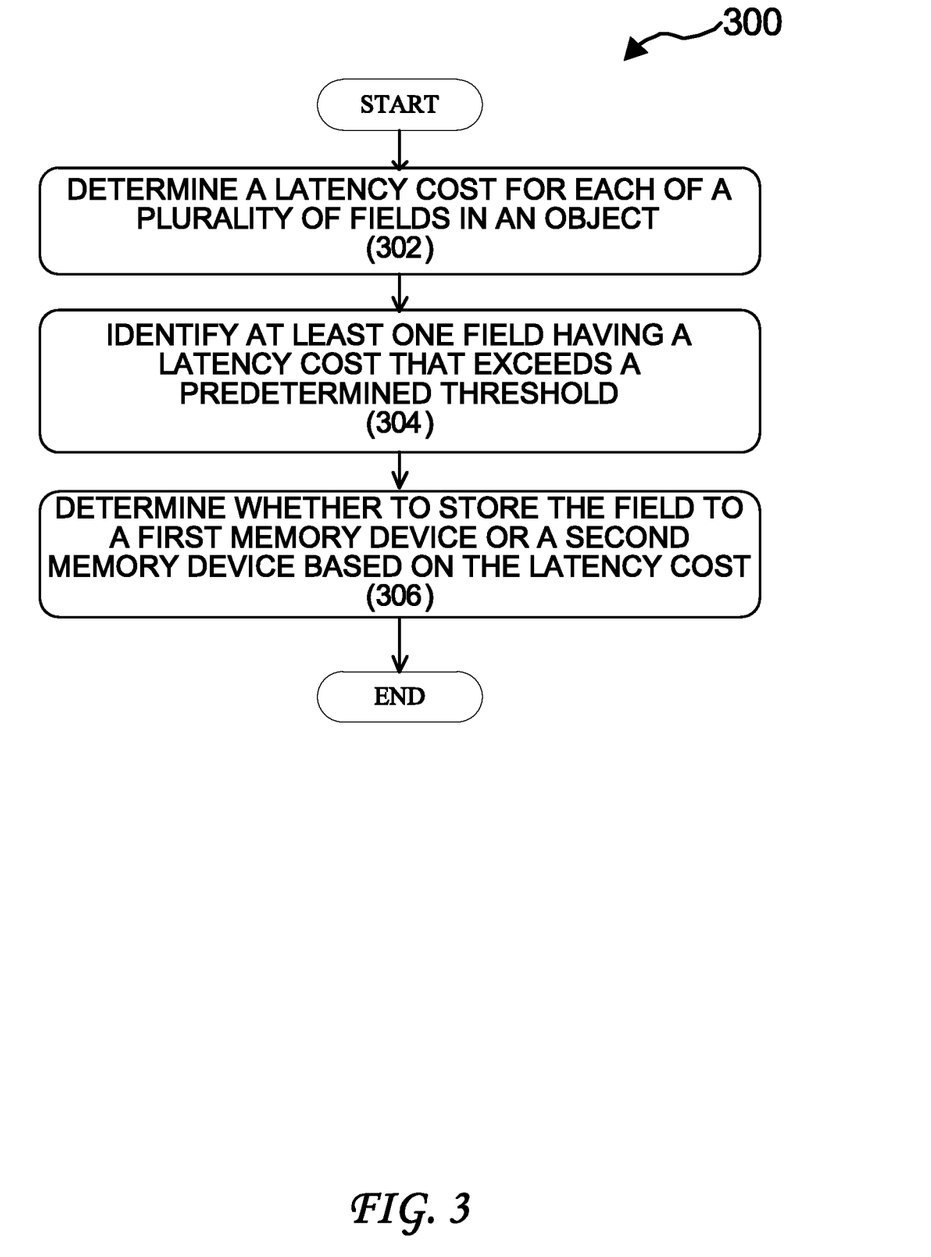
FIG. 3 illustrates an example process for identifying a target storage device for object-fields, according to some aspects of the technology.

FIG. 3 illustrates an example process 300 for identifying a target storage device for an object field. Process 300 begins with step 302 in which a latency cost is determined for each field in an object. Cost calculations for a given object-field can be based on calculations of access frequency (AccessFreq), an access frequency cost factor (ACFactor), a device latency (Latency), and a re-computation cost factor (RCF) for the field, as discussed above with respect to equation (1). In some instances, a total cost associated with the object may be computed, e.g., based on the sum of costs across each object-field, as indicated above by equation (2). Although equations (1) and (2) provide examples of various cost metrics that may be calculated for an object-field or an entire object, other calculations may be performed, without departing from the scope of the technology.

In step 304, at least one field having a cost that exceeds a predetermined threshold is identified. In some aspects, identification of a particular object-field can be based on comparison of an associated cost with the predetermined threshold. The predetermined threshold (cost threshold) may be automatically configured based on various parameters, such as available space in the memory devices in the tiered storage system. In some aspects, the threshold may be manually set, for example, by a user or system administrator. In other aspects, a particular field may be tagged by a user or system administrator, for example, to give the field storage priority to a specific memory device or memory-type.

In step 306, it is determined whether the field should be stored to a first memory device or to a second memory device, based on the latency cost. As discussed above, target storage device determinations may be based on a comparison of the calculated (latency) cost to the predetermined threshold, wherein if the cost exceeds a predetermined threshold the field is stored to a first memory device (e.g., a PMEM device). Alternatively, if the cost is below the predetermined threshold, the field may be stored to a second memory device (e.g., a DRAM or HDD device).

The selected storage device may be chosen based on additional factors, such device availability and usage level. For example, if a PMEM device is at full-capacity, and storing high cost data relative to a particular field, the field may be stored in either a DRAM or HDD device, depending on the need for data persistence.

As described above, persistent memory provides byte addressability and persistence, such that it is possible to access various fields of an object directly without serialization and deserialization. Keeping certain fields of an object in persistent memory rather than the entire object brings many advantages. One advantage is a smaller memory footprint which implies more data can be kept in memory. This in turn leads to less serialization and deserialization. This layout also provides way for in-place faster computing. It is possible to model each composite data structure into collection of fields that spans across multiple storage layers. For example, a list data structure can have certain fields in disks, certain fields in persistent memory while some fields in dynamic random-access memory (DRAM).

Intelligent layout of composite data structures in tiered storage with persistent memory can have important implications in cloud computing and big data computing environments. For example, using PMEM, serialization and deserialization can be avoided for read/writes of objects from memory.

Figure 4A:
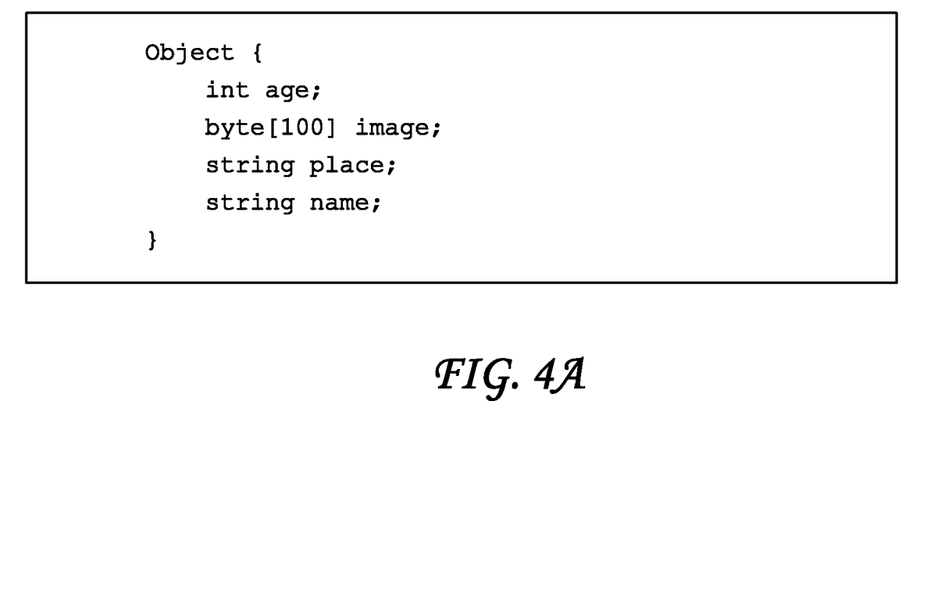
FIG. 4A illustrates an example of programming code for an object, according to some aspects of the technology.

Consider the example object illustrated in FIG. 4A. In this example, some fields of the object may be stored in DRAM, some in persistent memory while others will be in disk (hard disk) in serialized form. In this example, loading just two fields 'name' and 'age' in persistent memory (while others in a HDD disk) would reduce memory usage and hence more objects can be stored to PMEM. Since other fields may not be needed for computation, some disk access events may be avoided, which can lead to faster data processing.

The described solution of tiered storage is not to be confused with caching, since caching involves storing multiple copies of the data in different types of storage devices (cache, DRAM, disk). The tiered storage separates the fields and selectively stores the fields in the appropriate storage device, as discussed above. In the illustration of FIG. 4A, fields 'name' and 'place' may be stored in persistent memory.

As discussed above, PMEM is most suitable for optimizing data accesses because PMEM provides persistence and byte addressability. The intelligent layout can accelerate data processing by selectively loading data required for computation. Use of memory is made more efficient by loading few required fields into persistent memory from disk. Advantageously, the described solutions providing tiered storage with persistent memory result in a greater amount of available memory, which can lead to faster processing. Furthermore, less serialization and deserialization is required for persisted data, which can lead to faster processing.

In some implementation, only "hot data" (e.g., high-latency cost data) is present in PMEM, thus increasing the utilization of expensive PMEM bytes. Since PMEM and disk are persistent stores, it is possible to further optimize the architecture by keeping only 1 copy of data either in PMEM or disk. Therefore, if data is loaded into PMEM, it is possible to delete the data from disk or vice versa.

Tiered storage with PMEM solutions can depend on a given application running on a system, and is distinct from tiered caching policies which are system wide configurations for storing additional copies of data in faster storage devices. In some aspects, an application can be an entity that needs/requests storage, or any software that requests memory from the underlying system. Each field in the objects needs storage space. The primary factors of storage devices that impact how an application performs are: memory speed, memory persistence, and byte addressability. For example, if byte addressability is of primary importance, the underlying data has to be kept in either DRAM or PMEM. In addition, if persistence is also needed, the data has to be kept in PMEM only since DRAM cannot provide persistence even though it can provide byte addressability and is in fact faster than PMEM devices.

Figure 4B:
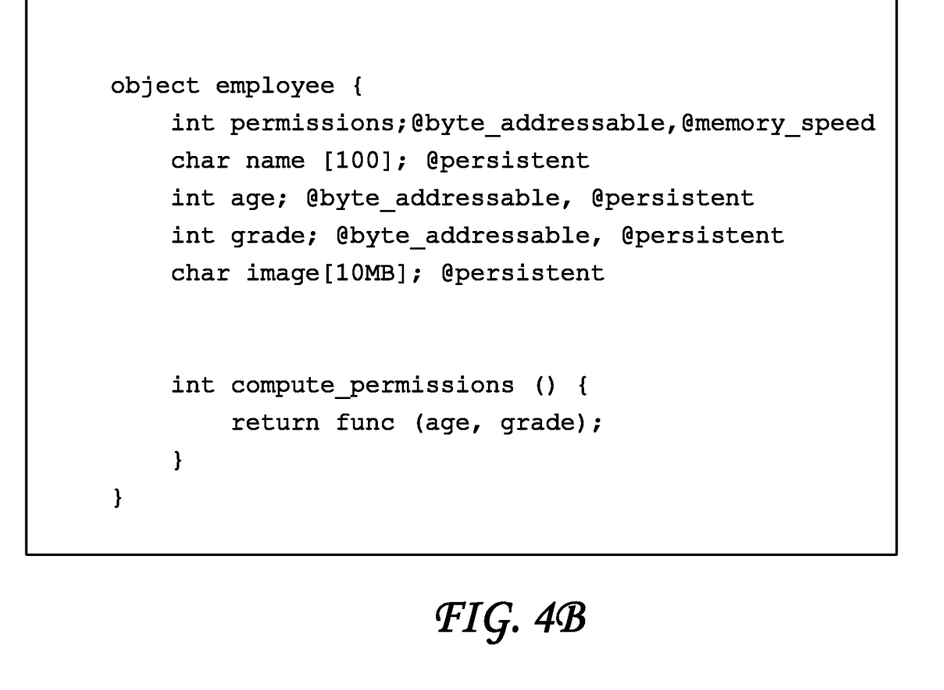
FIG. 4B illustrates an example of programming code for an object, including tags that indicate object-field characteristics, according to some aspects of the technology.

FIG. 4B illustrates an example of programming code for an object ("employee"), including user tags that indicate object-field characteristics. In this example, the fields "age", "grade", and, "image" can require persistence. In this example, the "permissions" field does not need persistence since it can be computed using compute_permissions ( ). The "permissions", "age", and "grade" fields can require byte addressability since the latter two are being used for computations in function compute_permissions( ) and the field permissions presumably is used for some other purpose. The "permissions" field may need memory speed access because, for example, an access control algorithm might be using this field to decide on some permissions.

In this example, fields of objects are labeled with appropriate labels such as @memory_speed, @persistent, and @byte_addressable. A dynamic memory allocator can take objects and their associated labels (<object, object_labels>) and allocate them to different storage devices based on the associated label/tag. If necessary, the dynamic memory allocator can moves fields and/or objects around based on storage space availability and the object labels.

When the application is run, the dynamic memory allocator can assign an available layer based on the requirements, e.g., best location that matches the requirements of specific objects). For example, for an object, if a particular field requires persistence but byte addressability is optional, the memory allocator has two storage options: PMEM or HDD. As long as there is enough free space in PMEM, the allocator selects PMEM, as PMEM access speeds are much faster than HDD.

The dynamic memory allocator can be responsible for moving data based on the data's priority and device characteristic requirements for the application. If PMEM space is not initially available, the memory allocator can assign the field to HDD, and then later move it to PMEM, when available. If another field requires byte addressability as well as persistence, the allocator can assign PMEM as the storage option, as conventional magnetic storage media, such as HDDs, do not support byte addressability.

Figure 5:
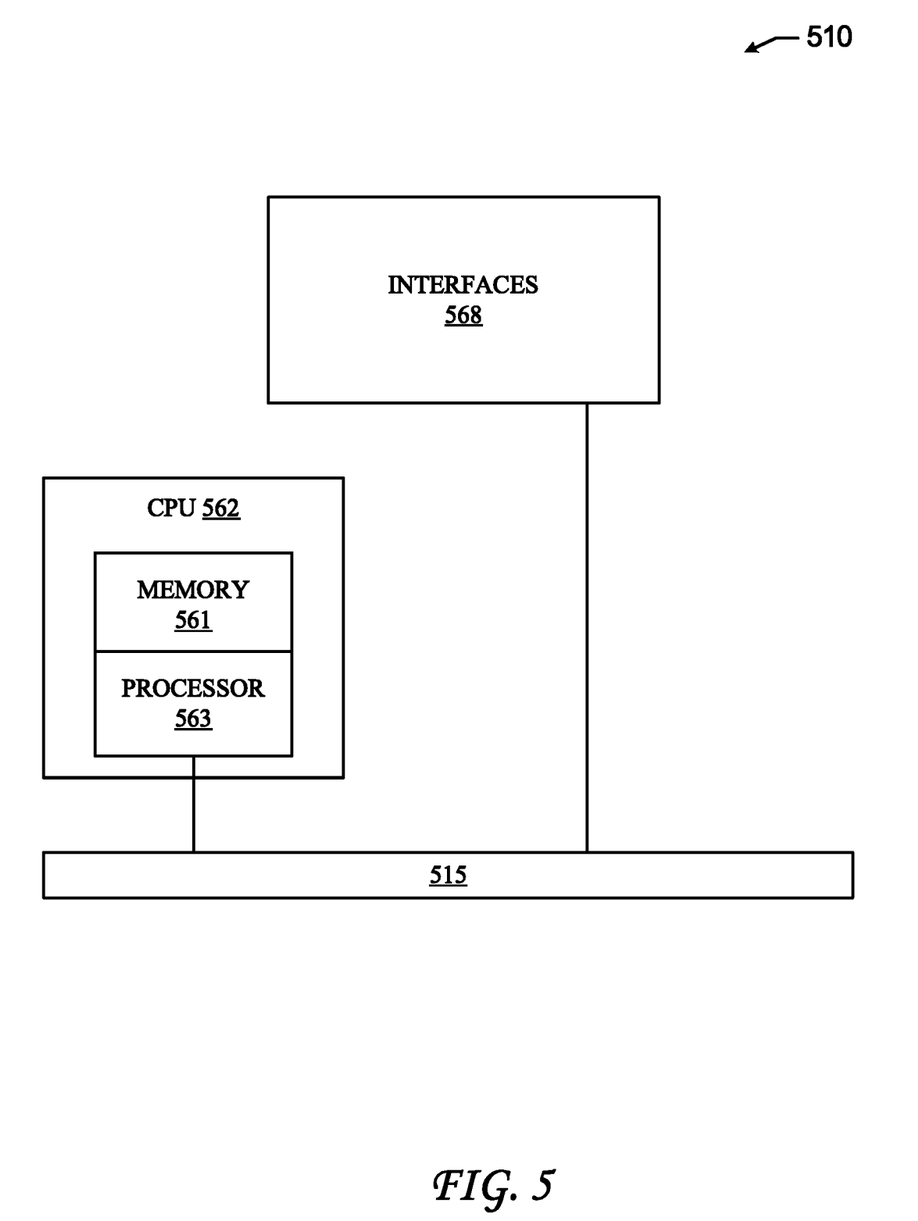
FIG. 5 illustrates an example computing device that may be used to implement some aspects of the technology.

FIG. 5 illustrates an example network device on which some aspects of the technology can be implemented. Network device 510 includes master central processing unit (CPU) 562, interfaces 568, and a bus 515 e.g., a Peripheral Computer Interconnect (PCI) bus. CPU 562 can be configured to perform monitoring for one or more virtual network functions under the control of software including an operating system and any appropriate applications software. CPU 562 can include one or more processors 563, such as processors from the Intel, ARM, and/or Motorola family of microprocessors or the MIPS family of microprocessors. In an alternative embodiment, processor 563 is specially designed hardware for controlling the operations of network device 510. In a specific embodiment, a memory 561 (such as non-volatile RAM and/or ROM) also forms part of CPU 562. However, there are many different ways in which memory could be coupled to the system.

Interfaces 568 can be provided as interface cards (sometimes referred to as "network interface cards" (NICs) or "line cards"). Generally, they control the sending and receiving of data packets over the network and sometimes support other peripherals used with device 510. Among the interfaces that may be provided are Ethernet interfaces, frame relay interfaces, cable interfaces, Digital Subscriber Line (DSL) interfaces, token ring interfaces, and the like. In addition, various very high-speed interfaces can be provided such as fast token ring interfaces, wireless interfaces, Ethernet interfaces, Gigabit Ethernet interfaces, Asynchronous Transfer Mode (ATM) interfaces, High Speed Serial Interfaces (HSSIs), Point of Sale (POS) interfaces, Fiber Distributed Data Interface (FDDIs), and the like. Generally, these interfaces can include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more non-transitory memories or memory modules (including memory 561) configured to store program instructions for general-purpose network operations and mechanisms necessary to implement one or more steps of a service chain auto-tuning process of the subject technology. For example, memory 561 can include a non-transitory computer-readable medium that includes instructions for causing CPU 562 to execute operations for determining a latency cost for each of a plurality of fields in an object, identifying at least one field, among the plurality of fields, having a latency cost that exceeds a predetermined threshold, determining whether to store the at least one field to a first memory device or a second memory device based on the latency cost. In some aspects, the operations can further include the above steps, wherein the latency cost for each of the fields in the object is based on an access frequency and a re-computation cost factor for the corresponding field. In some aspects, the operations can further include the above steps, wherein the latency cost for each of the fields in the object is based on an access cost factor and a latency for the corresponding field.

For clarity of explanation, the illustrative system embodiment is presented as including individual functional blocks including functional blocks labeled as a "processor" or processor 420. The functions these blocks represent may be provided through the use of either shared or dedicated hardware, including, but not limited to, hardware capable of executing software and hardware, such as a processor 420, that is purpose-built to operate as an equivalent to software executing on a general purpose processor. For example, the functions of one or more processors may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 440 for storing software performing the operations discussed below, and random access memory (RAM) 450 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 400 can practice all or part of the recited methods, can be a part of the recited systems, and/or can operate according to instructions in the recited non-transitory computer-readable storage media. Such logical operations can be implemented as modules configured to control the processor 420 to perform particular functions according to the programming of the module.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method, comprising:
   determining a read/write cost for each of a plurality of fields in an object based on storage of the each of the plurality of fields as persistent data or non-persistent data, wherein the read/write cost including re-computation cost factors, each re-computation cost factor is a cost of re-computing a corresponding field value of each of the plurality of fields when the corresponding field is lost through storage as non-persistent data;
   identifying at least one field, among the plurality of fields, having the read/write cost that exceeds a predetermined threshold, based at least in part on the re-computation cost factor of the at least one field if stored as either persistent or non-persistent data; and
   determining whether to store the at least one field to a first memory device or a second memory device based on the read/write cost, wherein at least one of the first memory device and the second memory device is a non-persistent memory device.

2. The computer-implemented method of claim 1, wherein the read/write cost for each of the fields in the object is based on an access frequency for the corresponding field.

3. The computer-implemented method of claim 1, wherein the read/write cost for each of the fields in the object is based on an access cost factor and latency associated with at least one of the first memory device and the second memory device.

4. The computer-implemented method of claim 1, wherein the first memory device is a volatile memory device.

5. The computer-implemented method of claim 1, wherein the second memory device is a non-volatile memory device.

6. The computer-implemented method of claim 1, wherein the first memory device is a dynamic random-access memory (DRAM).

7. The computer-implemented method of claim 1, wherein the second memory device is a byte-addressable persistent memory (PMEM).

8. A system comprising: one or more processors; and a computer-readable medium comprising instructions stored therein, which when executed by the processors, cause the processors to perform operations comprising:
   determining a read/write cost for each of a plurality of fields in an object based on storage of the each of the plurality of fields as persistent data or non-persistent data, wherein the read/write cost including re-computation cost factors, each re-computation cost factor is a cost of re-computing a corresponding field value of each of the plurality of fields when the corresponding field is lost through storage as non-persistent data;
   identifying at least one field, among the plurality of fields, having the read/write cost that exceeds a predetermined threshold, based at least in part on the re-computation cost factor of the at least one field if stored as either persistent or non-persistent data; and
   determining whether to store the at least one field to a first memory device or a second memory device based on the read/write cost, wherein at least one of the first memory device and the second memory device is a non-persistent memory device.

9. The system of claim 8, wherein the read/write cost for each of the fields in the object is based on an access frequency for the corresponding field.

10. The system of claim 8, wherein the read/write cost for each of the fields in the object is based on an access cost factor and latency associated with at least one of the first memory device and the second memory device.

11. The system of claim 8, wherein the first memory device is a volatile memory device.

12. The system of claim 8, wherein the second memory device is a non-volatile memory device.

13. The system of claim 8, wherein the first memory device is a dynamic random-access memory (DRAM).

14. The system of claim 8, wherein the second memory device is a byte-addressable persistent memory (PMEM).

15. A non-transitory computer-readable storage medium comprising instructions stored therein, which when executed by one or more processors, cause the processors to perform operations comprising:
   determining a read/write cost for each of a plurality of fields in an object based on storage of the each of the plurality of fields as persistent data or non-persistent data, wherein the read/write cost including re-computation cost factors, each re-computation cost factor is a cost of re-computing a corresponding field value of each of the plurality of fields when the corresponding field is lost through storage as non-persistent data;
   identifying at least one field, among the plurality of fields, having the read/write cost that exceeds a predetermined threshold, based at least in part on the re-computation cost factor of the at least one field if stored as either persistent or non-persistent data; and
   determining whether to store the at least one field to a first memory device or a second memory device based on the read/write cost, wherein at least one of the first memory device and the second memory device is a non-persistent memory device.

16. The non-transitory computer-readable storage medium of claim 15, wherein the read/write cost for each of the fields in the object is based on an access frequency for the corresponding field.

17. The non-transitory computer-readable storage medium of claim 15, wherein the read/write cost for each of the fields in the object is based on an access cost factor and latency associated with at least one of the first memory device and the second memory device.

18. The non-transitory computer-readable storage medium of claim 15, wherein the first memory device is a volatile memory device.

19. The non-transitory computer-readable storage medium of claim 15, wherein the second memory device is a non-volatile memory device.

20. The non-transitory computer-readable storage medium of claim 15, wherein the second memory device is a byte-addressable persistent memory (PMEM).

\* \* \* \* \*